United States Patent [19]

Tanaka

[11] Patent Number: 4,559,455

[45] Date of Patent: Dec. 17, 1985

[54] ACCESSORY CARRYING TYPE STARTING MOTOR

[75] Inventor: Toshinori Tanaka, Himeji, Japan

[73] Assignee: Mitsubishi Denki Kabushiki Kaisha, Tokyo, Japan

[21] Appl. No.: 567,879

[22] Filed: Jan. 3, 1984

[30] Foreign Application Priority Data

Jan. 8, 1983 [JP] Japan .............................. 58-1563[U]

[51] Int. Cl.[4] .............................................. H02K 7/10

[52] U.S. Cl. ....................................... 290/38 R; 318/4

[58] Field of Search ................ 290/38 R, 38 A, 38 C, 290/38 E, 48; 318/4; 123/179 R, 179 A; 74/7 C

[56] References Cited

U.S. PATENT DOCUMENTS 2,322,280 6/1943 Cooper .................................... 318/4
2,344,152 3/1944 Klein ...................................... 74/7 C
2,414,602 1/1947 Mott .................................... 318/4 X
4,232,521 11/1980 Mallofre ................................ 60/605
4,481,424 11/1984 Hattori et al. .................... 290/38 R

*Primary Examiner*—William M. Shoop, Jr.
*Assistant Examiner*—W. E. Duncanson, Jr.
*Attorney, Agent, or Firm*—Oblon, Fisher, Spivak, McClelland & Maier

[57] ABSTRACT

An accessory carrying type starting motor comprises an electromagnetic switching device for opening and closing a contact to control actuation of a d.c. motor, a pinion placed to be slidable by a transferring device fitted to one end of the rotary shaft of the armature of the d.c. motor, through a shift lever connected to a plunger of the electromagnetic switching device, a ring gear transmitting a rotational force for starting to a crank shaft of an internal combustion engine when the ring gear comes to interlock with the pinion, an accessory device consisting of a pump and other elements provided at the other end of the rotary shaft of the armature of the d.c. motor, and a rotational force connecting and disconnecting device which is interposed between the accessory device and the armature and which is brought into a releasing state when the pinion is interlocked with the ring gear by means of the electromagnetic switching device and is brought into a coupling state when the pinion is in a non-interlocking state.

1 Claim, 2 Drawing Figures

ACCESSORY CARRYING TYPE STARTING MOTOR

The present invention relates to a d.c. motor as a starter. More particularly, it relates to an improvement in a starting motor equipped with accessories such as a pump and other elements.

There has so far been proposed a starting motor of this kind as shown in FIG. 1. In FIG. 1, the reference numeral 1 designates, as a whole, an accessory carrying type starting motor mounted on an internal combustion engine 2; 3 designates a d.c. motor, 4 designates an electromagnetic switching device mounted on the front frame (not shown) together with the d.c. motor. An overrunning clutch 5 is connected to one end of a rotary shaft 6 of the d.c. motor through a spline structure so as to be slidable in the axial direction. A pinion 7 is connected to the overrunning clutch 5 in the same axial line while permitted to rotate in a specific direction. A pump 8 is connected to the other end, namely at the side opposite the pinion 7, of the rotary shaft 6. There is provided a shift lever 9 so as to be capable of swinging around a pivotal point 9*a* and one end of the shift lever is brought into cam-engagement with a groove 11 formed at the rear part of the outer casing 10 of the overrunning clutch 5 while the other end is brought into cam-engagement with a plunger 12 of the electromagnetic switching device 4. An attracting coil 13 for attract-exciting the plunger 12 and a holding coil 14 for holding the plunger 12 are respectively wound around the plunger 12. A movable contact device 15 is placed opposing a stationary contact 16 to form a pair of contacts so that when the movable contact 15 is urged by the plunger 12, it comes to contact with the stationary contact 16. A key switch 17 for starting and a car battery 18 are connected in series between the joint of the coils 13 and 14 and the ground. A ring gear 19 is shrink-fitted to the outer periphery of a flywheel 21 secured to the crank shaft 20 of the engine 2 and is brought into interlocking with the pinion 7 when the pinion is forwardly moved. The reference numeral 22 designates a switch for actuating the pump 8.

The operation of the conventional starting motor having the construction abovementioned will be described. Closing of the key switch 17 actuates both the attracting coil 13 and the holding coil 14 of the electromagnetic switching device 4 to excite the plunger 12 so that it is pulled into a casing (toward the right hand in the figure). As a result, the shift lever 9 is turned clockwisely around the pivotal point 9*a* as shown by the arrow mark and the overrunning clutch 5 is urged forwardly on and along the rotary shaft 6 thereby causing the pinion 7 to interlock with the ring gear 19. Simultaneously, the movable contact device 15 is brought into contact with the opposing stationary contact 16 by the plunger 12 to electrically connect the d.c. motor 3 to the car battery 18 so that the d.c. motor generates a rotational force. The rotational force is transmitted to the ring gear 19 through the rotary shaft 6, the overrunning clutch 5 and the pinion 7 in this order; thus, the crank shaft 20 of the internal combustion engine 2 is started.

After start of the engine, there may be caused reverse actuation of the pinion 7 by the ring gear 19. However, a one-way rotational force transmitting function of the overrunning clutch 5 prevents the pinion 7 from transmitting the rotational force to the outer casing 10 of the overrunning clutch 5 and the rotary shaft 6 is caused to effect non-load rotation by the d.c. motor 3.

When the key switch 17 is opened, the plunger 12 and the movable contact device 15 are returned to the original positions as shown in FIG. 1 by cooperative force of both a return spring (not shown) acting on the plunger 12 and a return spring (not shown) acting on the movable contact device 15. At the same time, actuation of the d.c. motor effected by current conduction is released and the movement of the shift lever 9 causes the overrunning clutch 5 to retract along the rotary shaft 6 in the right direction as shown in FIG. 1. Interlocking state between the pinion 7 and the ring gear 19 is, therefore, separated and the pinion 7 is returned to the position as shown in the figure. In this state, when the switch 22 is closed, the d.c. motor 3 is electrically connected to the car battery 18 whereby the d.c. motor begins to rotate. Actuation of the d.c. motor 3 drives the pump 8 to compress a working fluid necessary to drive other devices (not shown). The compressed working fluid is used as a driving source to other devices and equipments though they are not shown in the figure. At the time of closing the switch, since the attracting coil 13 and the holding coil 14 of the electromagnetic switching device 4 are connected in series to the switch 22 so that they produce exciting magnetic fluxes in the direction opposite each other, there is produced no magnetic flux for exciting the plunger 12, hence the electromagnetic switching device 4 is not operated.

In the conventional device being so constructed that the pinion 7 is forwardly moved to interlock with the ring gear 19 of the internal combustion engine 2 and the pump 8 connected to the rotary shaft 6 is driven to rotate even when the internal combustion engine 2 is started by means of the d.c. motor 3, a substantial amount of energy is consumed by the pump 8 whereby power for starting the engine is reduced disadvantageously.

It is an object of the present invention to eliminate the disadvantage of the conventional starting device and to provide an accessory carrying type starting motor reducing consumption of power by constructing it in such a manner that a rotary shaft of a d.c. motor is made slidable in its axial direction and a clutch is provided at one end of the rotary shaft so as to be connected with and to be disconnected from a pump so that connection of the rotary shaft to the pump is released when an internal combustion engine is started.

The foregoing and the other objects of the present invention have been attained by providing an accessory carrying type starting motor comprising an electromagnetic switching device for opening and closing a contact to control actuation of a d.c. motor, a pinion placed to be slidable by a transferring device fitted to one end of the rotary shaft of the armature of the d.c. motor, through a shift lever connected to a plunger of the electromagnetic switching device, a ring gear transmitting a rotaticnal force for starting to a crank shaft of an internal combustion engine when the ring gear is brought into interlocking with the pinion, an accessory device consisting of a pump and other elements provided at the other end of the rotary shaft of the armature of the d.c. motor, and a rotational force connecting and disconnecting device which is interposed between the accessory device and the armature and which is brought into a releasing state when the pinion is connected to the ring gear and is caused to couple the accessory device with the d.c. motor when the pinion is disconnected from the ring gear.

Various other objects, features and attendant advantages of the present invention will be more fully appreciated as the same becomes better understood from the following detailed description when considered in connection with the accompanying drawings in which like reference characters designate like or corresponding parts throughout the several views and wherein.

Figure 2:
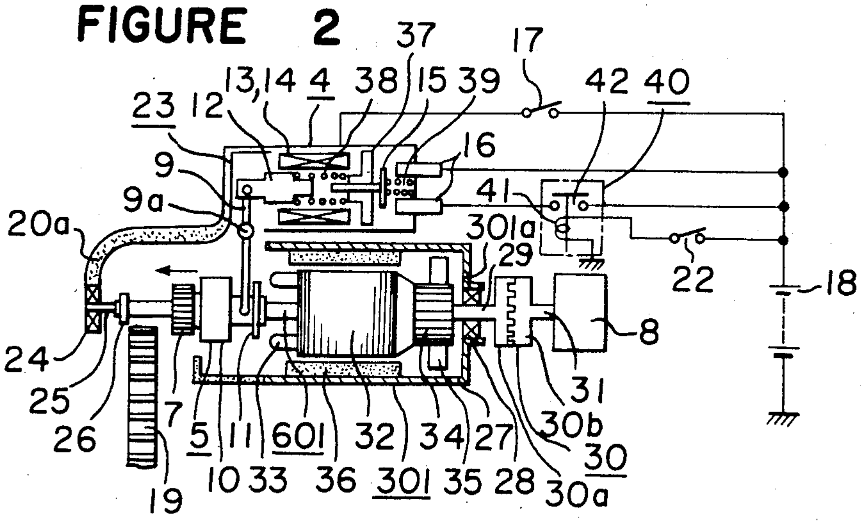
FIG. 2 is a schematic view of an embodiment of the accessory carrying type starting motor of the present invention.

FIG. 2 shows the construction of an accessory carrying type starting motor of the present invention. In FIG. 2, there is provided a front frame 23 on which a d.c. motor 301 and an electromagnetic switching device 4 are mounted. A bearing 24 is fixed to an elongated part 20*a* of the front frame so as to support a journal part 25 provided at the front end of a rotary shaft 601 so that the rotary shaft is made rotatable around its center axis and slidable in the axial direction. A stopper 26 is provided at the front end portion of the rotary shaft 601, on account of which a position of an overrunning clutch 5 when forwardly moved is determined by striking of the pinion 7 against the stopper 26. A casing 27 for the d.c. motor 301 has a rear end flange part 301*a* in which a bearing 28 is held. The bearing 28 supports a journal part 29 formed at the rear end of the rotary shaft 601 so that the rotary shaft is rotated around the center axis and is slidable along the axial line. A coupling 30 is constituted by a jaw clutch 30*a* secured at the rearmost end of the rotary shaft 601 and a jaw clutch 30*b* secured to the rotary shaft 31, by which the rotational force of the rotary shaft 601 is connected to and disconnected from a pump 8 by such a function as described later.

The d.c. motor 301 comprises an armature iron core 32 firmly connected to the rotary shaft 601, an armature coils 33 held in slots (not shown) formed in the armature iron core, a rectifier 34 electrically and mechanically connected to the armature coil 33, brushes 35 undergoing sliding contact with the rectifier 34, and poles 36 consisting of permanent magnets which are attached on the inner circumferential surface of the casing 27.

The electromagnetic switching device 4 comprises a stationary iron core 37, a plunger 12, a movable contact 15 and coil springs 38 and 39 respectively acting on the plunger 12 and the movable contact 15. A relay 40 is constituted by a coil 41 to be energized by operating a switch 22 and a contact 42 to be closed by the energizing of the coil 41. The other elements designated by the some reference numerals as in FIG. 1 have the same structure as those in FIG. 1 and accordingly explanation is omitted.

The operation of the starting motor constructed abovementioned will be described.

Figure 1:
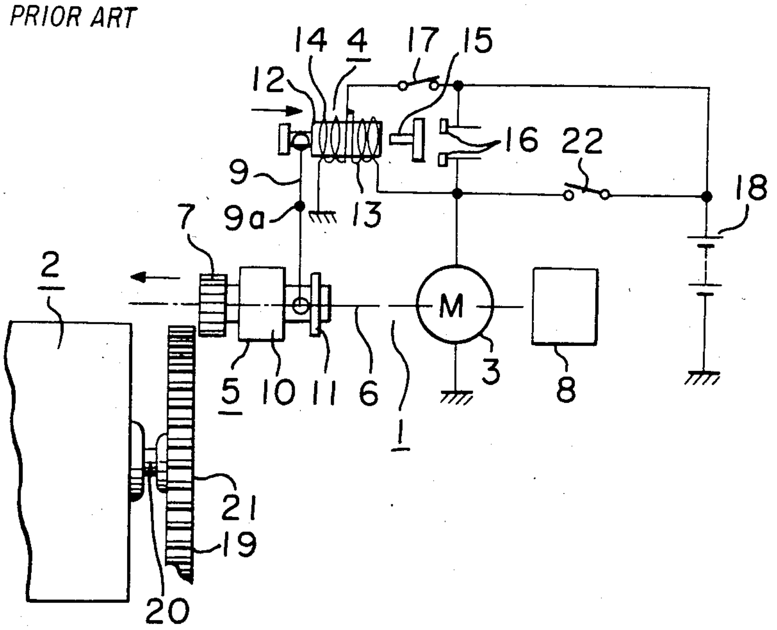
FIGURE 1 PRIOR ART
FIG. 1 is a schematic view of a conventional starting motor.

When the key switch 17 is closed, the electromagnetic switching device 4 is actuated by current conduction passing therethrough in the same manner as described in connection with the conventional starting device in FIG. 1 and there takes place subsequent operations as follows, the plunger 12 causes the shift lever 9 to turn clockwisely around a pivotal point 9*a* as shown in FIG. 2; the overrunning clutch 5 is forwardly shifted on and along a spline structure (not shown) formed in association with the rotary shaft 601 because the outer casing 10 is connected through the spline structure with the rotary shaft 601 so as to be slidable in the axial direction; the forward movement of the overrunning clutch 5 causes the pinion 7 to move until it comes to contact with the stopper 26; after the pinion 7 having contacted with the stopper 26, stressing function of the shift lever 9 urges the rotary shaft 601 forwardly so that it slides along the inner surfaces of the bearings 24 and 28 on the left side in FIG. 2; connection between the jaw clutches 30*a* and 30*b* of the coupling 30 is released; disconnection of the jaw clutch 30*a* from the jaw clutch 30*b* takes place connection between the pinion 7 and the ring gear 19 and simultaneously, the rotational force between the d.c. motor 301 and the pump 8 is disconnected and rotational force of the d.c. motor is transmitted to the ring gear 19 through the pinion 7 to thereby start the engine.

When the key switch 17 is opened, the plunger 12 and the movable contact 15 are returned to the position as indicated in the FIG. 2 by the coil springs 38, 39 to disconnect the pinion 7 from the ring gear 19, hence the rotary shaft 601 is also returned to the original position. Instantaneously, the jaw clutches 30*a* and 30*b* of the coupling 30 are come to meshing with each other as shown in the figure to thereby connect the rotational force of the rotary shaft 601 to the rotary shaft 31 of the pump 31.

When the switch 22 is closed, the coil 41 of the relay 40 is actuated by current conduction and the contact 42 is closed to actuate the d.c. motor 301 for generation of rotational force. The rotational force is transmitted to the pump 8 through the coupling 30 to drive the pump 8. At this moment, power is not transmitted to the internal combustion engine 2 since the pinion 7 is in its returning position.

In the foregoing, explanation has been made as to a case that the poles 36 are constituted by a permanent magnet. The same effect can be attained even when a d.c. motor having a coil-wound stator in which an electromagnetic field exciting means is wound on the poles, is used.

In the embodiment as described above, the pump 8 is placed in coaxial with the d.c. motor 301 and jaw clutches are used to constitute a coupling 30 even though a special explanation has not been made. However, a conical type clutch or a friction type clutch can be used to obtain the same effect.

Thus, in accordance with the accessory carrying type starting motor of the present invention, since the rotary shaft of a d.c. motor is supported by bearings fixed to a frame so as to be slidable in the axial direction of the rotary shaft and one end of the rotary shaft is connected to the rotary shaft of a pump through a coupling means so as to be connected to and disconnected from the pump, there are provided excellent effects such that the structure of the starting device is simple and a large rotational force required to start an engine is obtained because there requires no power to be consumed by accessory.

I claim:

1. An accessory carrying type starting motor assembly for a vehicle comprising an engine, a crank shaft operatively connected to the engine, a ring gear secured to the crank shaft, a battery, and a key switch in series with the battery, said assembly comprising:

(a) a frame;

(b) a d.c. motor mounted on said frame;

(c) a first rotary shaft operatively connected to said d.c. motor such that operation of said d.c. motor causes rotation of said first rotary shaft, said first rotary shaft being journaled for axial movement in said frame between a first position and a second position;

(d) a pinion and an overrunning clutch mounted on said first rotary shaft for rotation therewith and axial movement relative thereto, said pinion being axially movable relative to said first rotary shaft between a first position in which it meshes with the ring gear secured to the crank shaft of the engine of the vehicle and a second position in which it does not mesh with the ring gear;

(e) a pump for pumping a working fluid used to power accessory devices;

(f) a second rotary shaft operatively connected to said pump such that rotation of said second rotary shaft causes actuation of said pump;

(g) a clutch comprising a first clutching member and a second clutching member, said first clutching member being mounted on said second rotary shaft and said second clutching member being mounted on said first rotary shaft and axially movable therewith between the first position of said first rotary shaft, in which said second clutching member does not engage said first clutching member, and the second position of said first rotary shaft, in which said second clutching member does engage said first clutching member, transmitting the rotation of said first rotary shaft to said second rotary shaft and then to said pump;

(h) an electromagnetic switching device comprising:

(i) a coil;

(ii) a plunger movable relative to said coil between a first position which it assumes when the key switch of the vehicle is open and a second position which it assumes when the key switch of the vehicle is closed;

(iii) a first spring biasing said plunger towards its first position;

(iv) a stationary contact in series between the battery and said d.c. motor;

(v) a movable contact movable relative to said coil between a first position which it assumes when the key switch of the vehicle is open and a second position which it assumes when the key switch of the vehicle is closed, said movable contact being in electrical contact with said stationary contact when said movable contact is in its second position and not being in electrical contact with said stationary contact when said movable contact is in its first position; and (vi) a second spring biasing said movable switch towards its first position;

(i) a pivotally mounted shift lever having a first end connected to said plunger and a second end connected to said pinion and said overrunning clutch such that motion of said plunger from its first position to its second position causes said pinion to move axially relative to said first rotary shaft from its second position to its first position and motion of said plunger from its second position to its first position causes said pinion to move axially relative to said first rotary shaft from its first position to its second position; and (j) a pump switch for actuating said pump, said pump switch being in series between the battery of the vehicle and said stationary contact, whereby:

(k) when the key switch of the vehicle is closed while said pump switch remains open, (i) said movable contact is brought into electrical contact with said stationary contact, providing a closed circuit between the batery and said d.c. motor which causes said d.c. motor to begin rotating;

(ii) movement of said plunger from its first position to its second position causes said pinion to move axially relative to said first rotary shaft until said pinion meshes with the ring gear secured to the crank shaft of the engine, whereby rotation of said pinion caused by said d.c. motor can be used to start the engine; and (iii) said first rotary shaft moves relative to said frame from its second position to its first position, whereby said second clutching member disengages from said first clutching member and the rotation of said first rotary shaft caused by said d.c. motor is not transmitted to said pump;

(l) when the key switch of the vehicle is subsequently opened while said pump switch remains open, (i) said second spring moves said movable contact out of electrical contact with said stationary contact, breaking the circuit between the battery and said d.c. motor and causing said d.c. motor to stop rotating;

(ii) movement of said plunger from its second position to its first position causes said pinion to move relative to said first rotary shaft until said pinion moves out of engagement with the ring gear secured to the crank shaft of the engine; and (iii) said first rotary shaft moves relative to said frame from its first position to its second position, whereby said second clutching member is brought into engagement with said first clutching member; and (m) when said pump switch is subsequently closed while the key switch of the vehicle remains open, an electrical circuit between the battery and said d.c. motor is closed, causing said d.c. motor to begin rotating, and the rotational motion of said d.c. motor is transmitted through said first rotary shaft and said clutch to said pump.

* * * * *